(12) United States Patent
Rahman et al.

(10) Patent No.: US 11,683,165 B2
(45) Date of Patent: Jun. 20, 2023

(54) QUANTUM KEY DISTRIBUTION NETWORKING AS A SERVICE

(71) Applicant: AT&T Intellectual Property I, L.P., Atlanta, GA (US)

(72) Inventors: Moshiur Rahman, Marlboro, NJ (US); William Trost, Mequon, WI (US); Daniel Solero, Rockwall, TX (US); Daniel Sheleheda, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/107,818

(22) Filed: Nov. 30, 2020

(65) Prior Publication Data
US 2022/0173896 A1    Jun. 2, 2022

(51) Int. Cl.
*H04L 9/08* (2006.01)
*H04L 41/12* (2022.01)

(52) U.S. Cl.
CPC .......... *H04L 9/0855* (2013.01); *H04L 9/085* (2013.01); *H04L 9/0827* (2013.01); *H04L 41/12* (2013.01)

(58) Field of Classification Search
CPC ..... H04L 9/0855; H04L 9/0827; H04L 9/085; H04L 9/0852; H04L 41/12
See application file for complete search history.

(56) References Cited

U.S. PATENT DOCUMENTS

| 2017/0214525 A1* | 7/2017 | Zhao ................. H04W 12/0431 |
| 2017/0264433 A1* | 9/2017 | Tanizawa ............. H04L 9/0858 |
| 2021/0158199 A1* | 5/2021 | Heckey .................. G06F 15/16 |

OTHER PUBLICATIONS

Yuan Cao et al., SDQaaS: software defined networking for quantum key distribution as a service; 2019; 1State Key Laboratory of Information Photonics and Optical Communications, Beijing University of Posts and Telecommunications, Beijing 100876, all (Year: 2019).*

Cao, et al., "SDQaaS: software defined networking for quantum key distribution as a service", Mar. 4, 2019, doi: 10.1364/OE.27.006892. PMID: 30876265 (Year: 2019).*

Cao et al., "SDQaaS: software defined networking for quantum key distribution as a service," Optics Express, Mar. 4, 2019, pp. 6892-6909, vol. 27, No. 5.

* cited by examiner

*Primary Examiner* — Daniel B Potratz
*Assistant Examiner* — William B Jones
(74) *Attorney, Agent, or Firm* — Hartman & Citrin LLC

(57) ABSTRACT

The concepts and technologies disclosed herein are directed to quantum key distribution ("QKD") networking as a service. According to one aspect disclosed herein, a microservices controller can establish a plurality of quantum connections with a plurality of virtual quantum connection managers ("vQCMs") deployed in association with a set of quantum user nodes ("QUNs") in a QKD network. The microservices controller can receive a request to initialize the QKD network. The microservices controller can coordinate with the plurality of vQCMs to handle initialization of the QKD network. The microservices controller can receive a QKD service request from a QKD network operator. The microservices controller can invoke a plurality of microservices to handle the QKD service request.

20 Claims, 8 Drawing Sheets

QUANTUM KEY DISTRIBUTION NETWORKING AS A SERVICE

BACKGROUND

Classical or binary computers use bits to perform calculations. Over the past several decades computers have become more powerful and more efficient and can be used to solve a wide range of problems. Some of these problems, however, are so complex that even the most powerful classical computers require long processing times or are incapable of processing altogether. To address these problems, scientists have turned to quantum physics for answers. While binary computers are limited to two possible states for each bit (i.e., 0 or 1), a quantum computer uses quantum bits (also known as qubits) that can be in superposition, or in other words, multiple states simultaneously (i.e., both 0 and 1). As a simplified example, two classical bits can encode information in one of four possible states 00, 01, 10, or 11, but two qubits can encode a superposition of these states simultaneously. When a qubit state is measured, the measured value is out of superposition and represented as one of the two classical states.

Quantum computing has many applications. Currently, one of the most viable use cases is in telecommunications in the form of quantum communications. Quantum communication takes advantage of the laws of quantum physics to protect data. More specifically, photons of light transmitting data along optical cables can be in superposition. If a hacker attempts to tamper with the qubits in superposition, the qubits will fall out of superposition and resolve to a classical state of 0 or 1. As a result, the activity of the hacker is easily detected.

Another viable use case of quantum technology is in cryptography. Quantum key distribution ("QKD") takes advantage of the unique properties of quantum physics to generate and distribute symmetric encryption keys. While QKD networks have been built upon existing fiber optic network infrastructure, the cost and complexity of QKD network development has led others to pursue QKD as a service ("QaaS") as a potential solution. QaaS allows multiple users to share the same QKD network infrastructure to obtain their required secret-key rates ("SKRs") and opt-in to its use as a service instead of developing and deploying their own QKD network.

Today, QaaS implementations rely on software-defined networking ("SDN"), such as described in "Yuan Cao, Yongli Zhao, Jianquan Wang, Xiaosong Yu, Zhangchao Ma, and Jie Zhang, "SDQaaS: software defined networking for quantum key distribution as a service," Opt. Express 27, 6892-6909 (2019)" (hereinafter "SDQaas"). SDQaaS uses SDN as the control plane to provide QaaS based upon an existing QKD network. The QaaS functions are developed in an SDN controller. SDQaaS also describes the protocol extension, intercommunication workflow, and routing and SKR assignment strategy for a QaaS implementation in the SDQaaS framework. SDN centralized control for QaaS is monolithic and difficult to develop, implement, package, and manage. Moreover, SDN-based QaaS does not have security measures in place during the QKD initialization phase, which exposes the QKD network operator to potential security threats.

SUMMARY

Concepts and technologies disclosed herein are directed to QKD networking as a service. According to one aspect of the concepts and technologies disclosed herein, a microservices controller can establish a plurality of quantum connections with a plurality of virtual quantum connection managers ("vQCMs") deployed in association with a set of quantum user nodes ("QUNs") in a QKD network. In some embodiments, the microservices controller can establish the plurality of quantum connections with the plurality of vQCMs via invocation of a quantum connection microservice. In some other embodiments, the microservices controller can establish the plurality of connections with the plurality of vQCMs via invocation of a plurality of microservices, each associated with one vQCM of the plurality of vQCMs. The microservices controller can receive a request to initialize the QKD network. The microservices controller can coordinate with the plurality of vQCMs to handle initialization of the QKD network.

In some embodiments, the microservices controller can coordinate with the plurality of vQCMs to configure the set of QUNs based on a desired network topology for the QKD network. The desired network topology for the QKD network can be received in the request to initialize the QKD network. The desired network topology for the QKD network alternatively can be based on a default setting.

In some embodiments, the QKD network includes a plurality of quantum links. Each quantum link of the plurality of quantum links can provide a quantum communication channel between two QUNs in the set of QUNs or between one QUN and one transfer repeater node ("TRN"). Each of the plurality of quantum links also provides a secret-key rate ("SKR").

The microservices controller can receive a QKD service request from a QKD network operator. The QKD service request can be associated with one or more users. The microservices controller can invoke a plurality of microservices to handle the QKD service request. In particular, the microservices controller can invoke an intelligent routing microservice to perform QKD path computation and selection to compute and select a least cost QKD path. The microservices controller also can invoke an SKR microservice to perform SKR search and selection based upon an SKR requirement specified in the QKD service request. In response to finding at least one SKR slot available on at least one of the plurality of quantum links that satisfies the SKR requirement, the microservices controller can invoke a quantum connection microservice to configure a source QUN and a destination QUN along the least cost quantum key distribution path. Additionally the quantum connection microservice can configure one or more intermediate QUNs and/or TRNs. The microservices controller can then notify the QKD network operator that the QKD request was successful.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein provide a microservices controller that provides a secure and efficient end-to-end QKD setup initialization service. The microservices controller is also able to add microservice-based flexibility together with efficient QKD network management. The shared microservices controller technique disclosed herein provides a global perspective with a centralized control in dynamic and complicated QKD network circumstances. Recently, a similar notion using SDN has been introduced in QKD networks for quantum-enabled service automation, time-sharing of QKD resources, QKD channel allocation, distributed denial of service ("DDoS") mitigation, key on-demand service provisioning, and multi-tenant provisioning. The centralized control provided by SDN is monolithic and difficult to develop, implement, package, and manage. The disclosed microservices controller, however, can provide centralized control that is modular and flexible to choose and deploy, chain, and implement. The microservices controller is also easy to maintain and evolve.

SDN-enabled QaaS does not provide security during the QKD initialization phase. This can expose the QKD network operator to potential security threats. The proposed solution provides a pre-established quantum connection between the microservices controller and quantum user nodes ("QUNs") to set up and initiate QKD network service. This added security in the initialization phase is only possible because of the proposed microservice-based intelligent quantum solution. The concepts and technologies disclosed herein systematically introduce QKD networks enabled by the microservices controller, which logically controls QKD resources and abstracts the QKD resources to the application layer through northbound and southbound interfaces and protocols.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
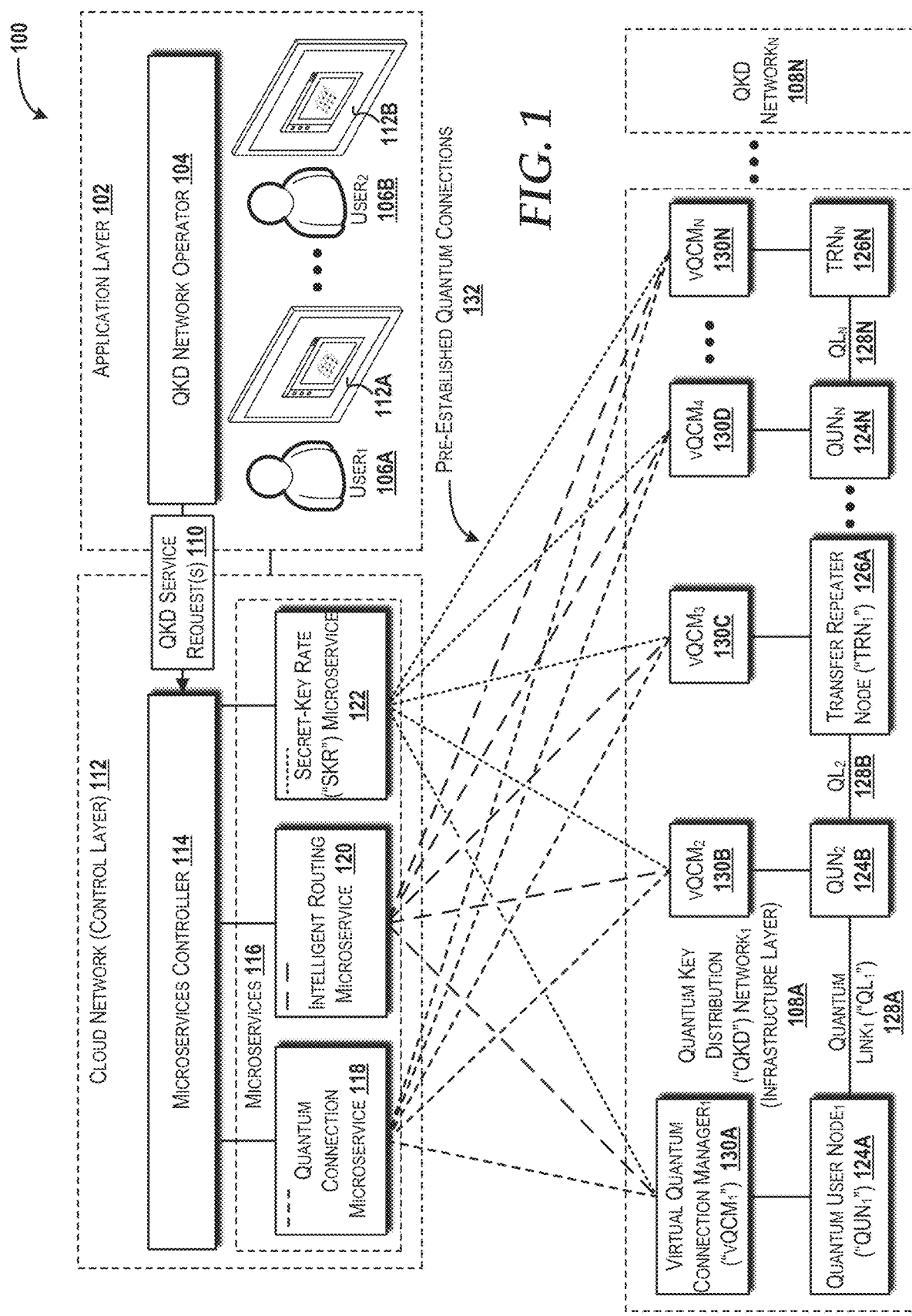
FIG. 1 is a block diagram of an operating environment in which aspects of the concepts and technologies disclosed herein can be implemented, according to an illustrative embodiment.

Turning now to FIG. 1, a block diagram illustrating an operating environment 100 in which aspects of the concepts and technologies disclosed herein can be implemented will be described, according to an illustrative embodiment. The operating environment 100 includes an application layer 102 in which a QKD network operator 104 and a plurality of users 106A-106B (collectively referred to as "users 106" or individually as "user 106") are shown. The QKD network operator 104 can offer the users 106 access to one or more QKD networks 108A-108N (collectively referred to as "QKD networks 108" or individually as "QKD network 108") through which one or more QKD services can be provided. The QKD networks 108 can be backbone/transport networks built upon a fiber optic and/or satellite infrastructure. For example, the QKD networks 108 can provide a backhaul network for one or more other network(s), which can be or can include one or more telecommunications networks (e.g., mobile and/or wireline networks), the Internet, one or more circuit-switched networks, one or more packet networks, combinations thereof, and the like. It should be understood that the concepts and technologies can be applied to other network types such as access networks. As such, the QKD networks 108 are not limited to any particular network type, and those skilled in the art will appreciate the applicability of the concepts and technologies disclosed herein to other network types.

The users 106 can apply to the QKD network operator 104 to obtain their required SKRs from the same QKD network infrastructure instead of deploying their own dedicated QKD networks. SKR is the rate at which secret keys can be generated on a given quantum connection. SKR is typically expressed in bits per second, but has no relationship to bandwidth or other types of network resources that are also expressed in bits per second. The users 106 can submit QKD service requests 110 (collectively referred to as "QKD service requests 110" or individually as "QKD service request 110") to the QKD network operator 104 via respective user computer systems 112A, 112B. Although a single QKD network operator 104 is illustrated, multiple QKD network operators 104 are contemplated. Moreover, the concepts and technologies disclosed herein do not limit the number of users 106 that can interact with the QKD network operator 104 or the means by which the users 106 do so. As such, the illustrated example should not be construed as being limiting in any way.

The QKD network operator 104 can interface with a cloud network 112 that provides a control layer for the QKD networks 108 through a microservices architecture. In the illustrated example, the microservices architecture includes a microservices controller 114 that controls the operation of a plurality of microservices 116, including a quantum connection microservice 118, an intelligent routing microservice 120, and an SKR microservice 122. Microservices, such as the microservices 116, and more particularly the quantum connection microservice 118, the intelligent routing microservice 120, and the SKR microservice 122 are applications that provide a focused piece of functionality and are often smaller and more lightweight than traditional services. The plurality of microservices 116 can include other microservices that can be used to provide different functionality disclosed herein. As such, the particular microservices 118, 120, 122 illustrated and described herein are provided as examples of how service functionality can be divided in the microservice architecture. It is contemplated that the microservices controller 114 may control fewer or more microservices depending on the granularity desired for a given implementation.

The microservices controller 114 can invoke the quantum connection microservice 118 to configure and complete point-to-point QKD connections. For example, the quantum connection microservice 118 can configure connections between two or more QUNs 124A-124N (collectively referred to as "QUNs 124" or individually as "QUN 124") by way of one or more transfer repeater nodes ("TRNs") 126A-126N (collectively referred to as "TRNs 126" or individually as "TRN 126") using quantum links ("QLs") 128A-128N (collectively referred to as "QLs 128" or individually as "QL 128") to constitute the QKD network 108A (and similarly on the QKD network(s) 108N, if applicable). The QUNs 124 are end nodes that can be connected to source or destination nodes of one or more of the users 106. The TRNs 126 are intermediate nodes between two QUNs 124 to achieve long distance QKD. The configuration of the QUNs 124 and the TRNs 126, as well as defining which are to serve as end nodes are design decisions and can vary widely among different implementation requirements. The illustrated example provides a simple network design that includes the typical elements involved, but does not intend to provide the complexity that is likely in a real-world implementation. Those skilled in the art will appreciate the numerous configurations of QUNs 124, TRNs 126, and QLs 128 to achieve desired implementation goals. As such, the illustrated configuration of the QKD network 108 should not be construed as being limiting in any way.

The microservices controller 114 can invoke the intelligent routing microservice 120 to compute and select a least cost QKD path between pairs of the QUNs 124 (including intermediate TRN(s) 126). The intelligent routing microservice 120 can consider real-time streaming analytics obtained from the QKD network 108 in the computation and selection of the least cost QKD path. In some embodiments, analytics can be obtained through a separate, dedicated microservice 116 or multiple microservices 116. The intelligent routing microservice 120 can support any dynamic routing techniques, including, for example, Dijkstra's shortest path algorithm or distance vector algorithm, and can populate the quantum router with the outcome under the control of the microservices controller 114 using representation state transfer ("REST")ful application programming interface ("API") or similar protocols/APIs.

The microservices controller 114 can invoke the SKR microservice 122 to perform SKR search and selection. In particular, the SKR microservice 122 can search for the available SKR on each of the QLs 128 along the QKD path obtained by the intelligent routing microservice 120. The available SKR is a real-time value based on the condition of a given QL 128. The QUNs 124 and/or the TRNs 126 can report the available SKR to the SKR microservice 122.

The microservices controller 114 and the microservices 116 can communicate with the QUNs 124A-124N via virtual quantum connection managers ("vQCMs") 130A-130N (collectively referred to as "vQCMs 130" or individually as "vQCM 130"). The vQCMs 130 can be embodied as a server/router collocated with the QUNs 124. Alternatively, the vQCMs 130 can be embodied as weblet or similar software construct that can be executed by the QUNs 124. The vQCMs 130 are connected to the microservices 116 via pre-established quantum connections 132. The pre-established quantum connections 132 provide secure connections that add end-to-end quantum security between the control layer and infrastructure layer of the QaaS model. End-to-end quantum security is not available in any current QaaS, including SDQaaS described herein above.

After the QKD network 108 has been configured and the QKD connections among the QUNs 124 and TRNs 126 through the various QLs 128 have been completed, the vQCMs 130 can report back to the microservices controller 114 the QKD network topology and the SKR available on each QL 128. The microservices controller 114 can then respond to the QKD service request(s) 110 from the QKD network operator 104. The QKD service request(s) 110 can be creation requests, modification requests, and/or deletion requests. Communication of the QKD service request(s) 110 can be handled using POST, PUT, and DELETE methods via hypertext transfer protocol ("HTTP").

Figure 2:
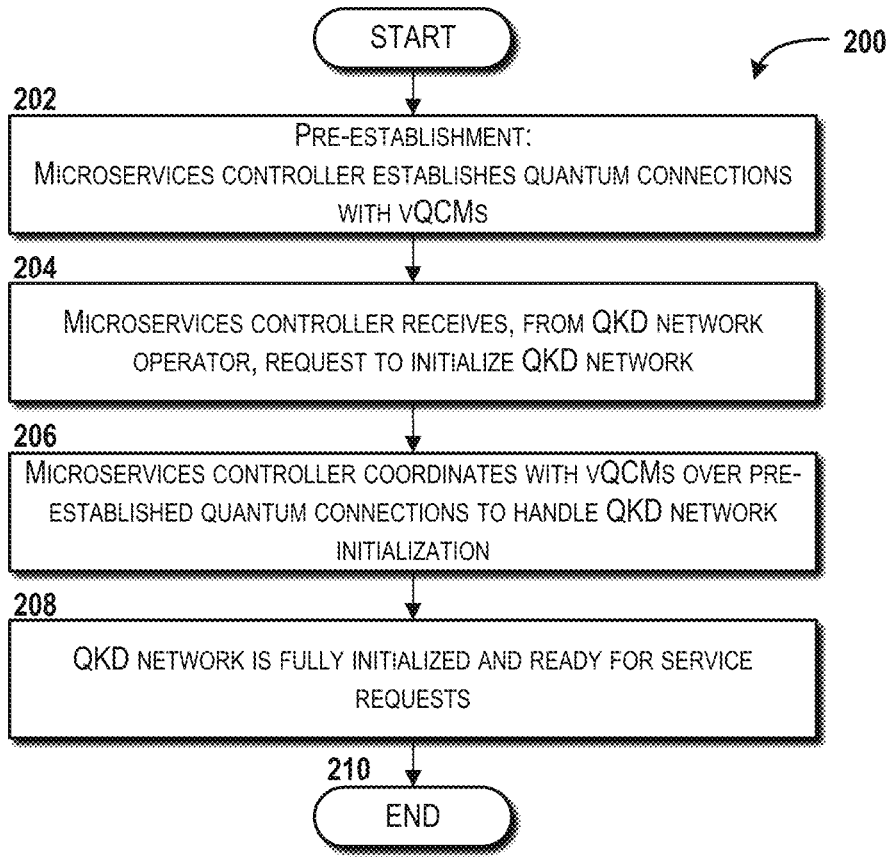
FIG. 2 is a flow diagram illustrating aspects of a method for initializing a quantum key distribution ("QKD") network via a microservices architecture, according to an illustrative embodiment of the concepts and technologies disclosed herein.

Turning now to FIG. 2, aspects of a method 200 for initializing the QKD network 108 via a microservices architecture will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or other processing component(s) disclosed herein to perform operations. It should be understood that the performance of one or more operations may include operations executed by one or more virtual processors at the instructions of one or more of the aforementioned hardware processors.

The method 200 begins and proceeds to operation 202. At operation 202, the microservices controller 114 establishes quantum connections (shown as pre-established quantum connections 132 in FIG. 1) with the vQCMs 130 serving the QUNs 124 and TRNs 126 in the QKD network 108. In some embodiments, the microservices controller 114 can invoke one of the microservices 116, such as the quantum connection microservice 118, to perform operation 202. In some embodiments, a different microservice or a sub-microservice can be created for each of the vQCMs 130 to serve as one of the endpoints for the pre-established quantum connections 132.

From operation 202, the method 200 proceeds to operation 204. At operation 204, the microservices controller 114 receives, from the QKD network operator 104, a request to initialize the QKD network 108 for one or more of the users 106. From operation 204, the method 200 proceeds to operation 206. At operation 206, the microservices controller 114 coordinates with the vQCMs 130 over the pre-established quantum connections 132 to handle initialization of the QKD network 108. In particular, the microservices controller 114 can configure the QUNs 124 and the TRNs 126 based on the desired network topology. The desired network topology may be provided in the request to initialize the QKD network 108. The microservices controller 114 may otherwise select a default network topology.

From operation 206, the method 200 proceeds to operation 208. At operation 208, the QKD network 108 is fully initialized and ready for any QKD service requests 110 from the QKD network operator 104.

From operation 208, the method 200 proceeds to operation 210. The method 200 can end at operation 210.

Figure 3:
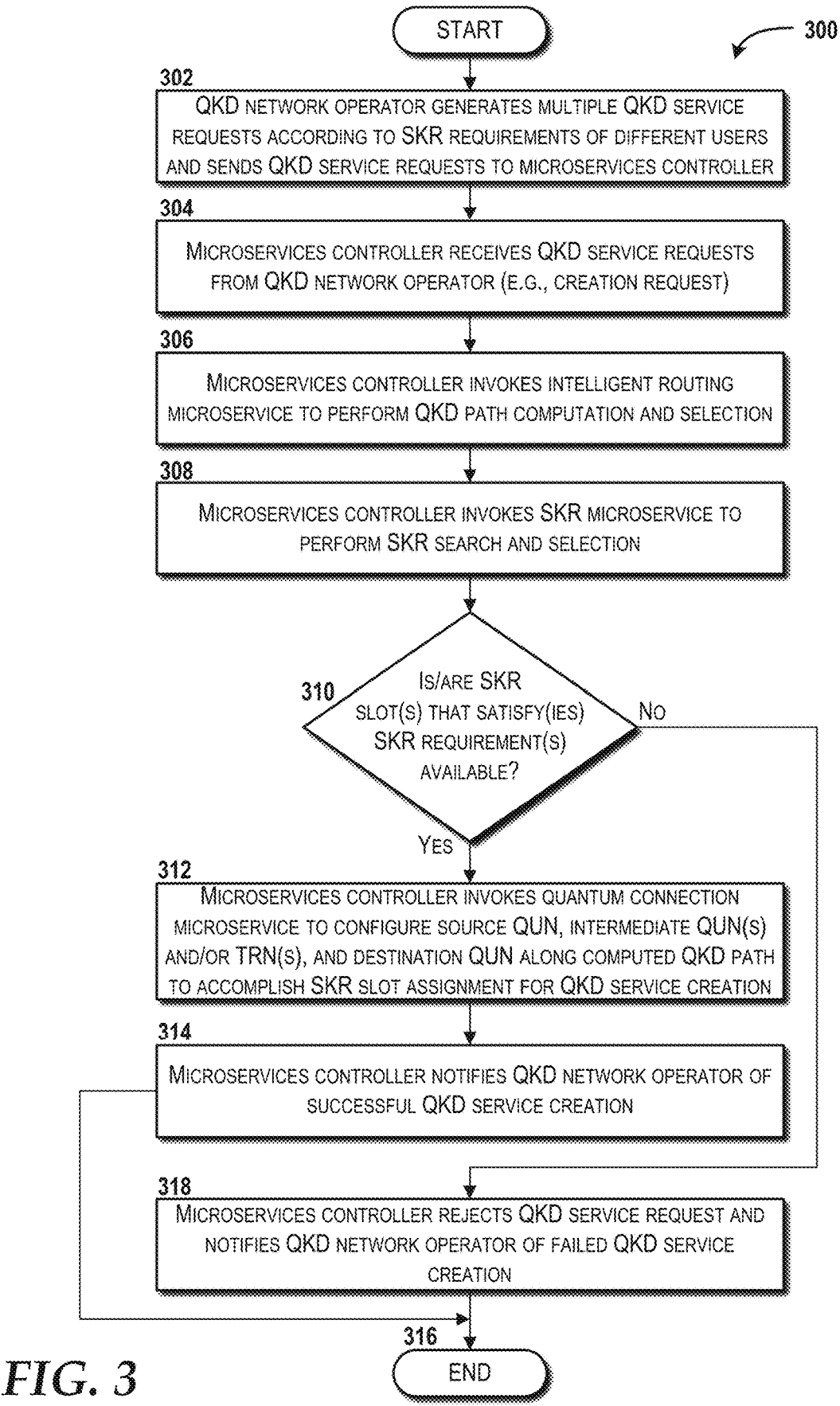
FIG. 3 is a flow diagram illustrating aspects of a method for processing a QKD service request, according to an illustrative embodiment of the concepts and technologies disclosed herein.

Turning now to FIG. 3, aspects of a method 300 for processing a QKD service request 110 will be described, according to an illustrative embodiment of the concepts and technologies disclosed herein. The method 300 will be described from the perspective of the QKD service request 110 including a service creation request. The QKD service request 110 also may be a modification request to modify a previously-created service or a deletion request to delete a previously-created service.

The method 300 begins and proceeds to operation 302. At operation 302, the QKD network operator 104 generates multiple QKD service requests 110 according to the SKR requirements of different users 106 and sends the QKD service requests 110 to the microservices controller 114. From operation 302, the method 300 proceeds to operation 304. At operation 304, the microservices controller 114 receives the QKD service requests 110 from the QKD network operator 104. The remaining operations of the method 300 describe a single QKD service request 110 as a service creation request, but in practice, the method 300 can be performed in multiple parallel iterations to accommodate multiple QKD service requests 110 received from the QKD network operator 104.

From operation 304, the method 300 proceeds to operation 306. At operation 306, the microservices controller 114 invokes the intelligent routing microservice 120 to perform QKD path computation and selection to compute and select a least cost QKD path. The intelligent routing microservice 120 can support any dynamic routing techniques, including, for example, Dijkstra's shortest path algorithm or distance vector algorithm, and can populate the quantum router with the outcome under the control of the microservices controller 114 using RESTful API or similar protocols/APIs. The concept of QKD path computation and selection is known in the art, and as such, additional details in this regard are not provided herein.

From operation 306, the method 300 proceeds to operation 308. At operation 308, the microservices controller 114 invokes the SKR microservice 122 to perform SKR search and selection based upon any SKR requirement(s) specified in the QKD service request 110. The concept of SKR search and selection is known in the art, and as such, additional details in this regard are not provided herein.

From operation 308, the method 300 proceeds to operation 310. At operation 310, the SKR microservice 122 determines if SKR slot(s) is/are available that satisfy(ies) the SKR requirement(s) identified in the QKD service request 110. If so, the method 300 proceeds to operation 312. At operation 312, the microservices controller 114 invokes the quantum connection microservice 118 to configure a source QUN, one or more intermediate QUNs and/or one or more TRN(s), and a destination QUN along the computed QKD path to accomplish SKR slot assignment for QKD service creation.

From operation 312, the method 300 proceeds to operation 314. At operation 314, the microservices controller 114 notifies the QKD network operator 104 of the successful QKD service creation. From operation 314, the method 300 proceeds to operation 316. The method 300 can end at operation 316.

Returning to operation 310, if no SKR slot(s) that satisfy(ies) the SKR requirement(s) is/are available, the method 300 proceeds to operation 318. At operation 318, the microservices controller 114 rejects the QKD service request 110 and notifies the QKD network operator 104 of the failed QKD service creation. From operation 318, the method 300 proceeds to operation 316. The method 300 can end at operation 316.

Figure 4:
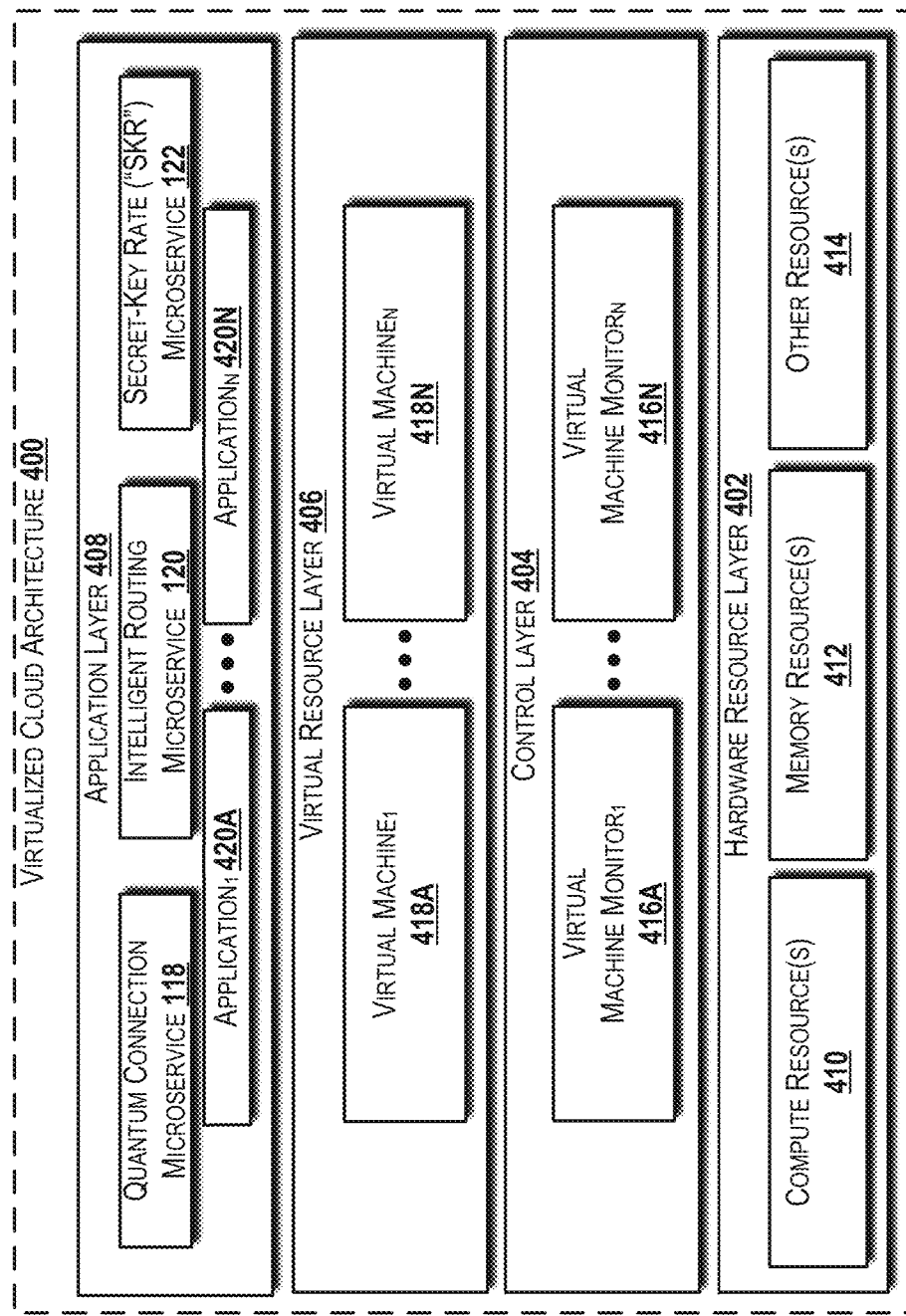
FIG. 4 is a block diagram illustrating an example virtualized cloud architecture and components thereof capable of implementing, at least in part, aspects of the concepts and technologies disclosed herein, according to an illustrative embodiment.

Turning now to FIG. 4, a block diagram illustrating an example virtualized cloud architecture 400 and components thereof will be described, according to an exemplary embodiment. The virtualized cloud architecture 400 can be utilized to implement various elements disclosed herein. For example, the virtualized cloud architecture 400 can be utilized as an implementation architecture for the cloud network 112.

The virtualized cloud architecture 400 is a shared infrastructure that can support multiple services and network applications. The illustrated virtualized cloud architecture 400 includes a hardware resource layer 402, a control layer 404, a virtual resource layer 406, and an application layer 408 that work together to perform operations as will be described in detail herein.

The hardware resource layer 402 provides hardware resources, which, in the illustrated embodiment, include one or more compute resources 410, one or more memory resources 412, and one or more other resources 414. The compute resource(s) 410 can include one or more hardware components that perform computations to process data, and/or to execute computer-executable instructions of one or more application programs, operating systems, and/or other software. The compute resources 410 can include one or more central processing units ("CPUs") configured with one or more processing cores. The compute resources 410 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 410 can include one or more discrete GPUs. In some other embodiments, the compute resources 410 can include CPU and GPU components that are configured in accordance with a co-processing CPU/GPU computing model, wherein the sequential part of an application executes on the CPU and the computationally-intensive part is accelerated by the GPU. The compute resources 410 can include one or more system-on-chip ("SoC") components along with one or more other components, including, for example, one or more of the memory resources 412, and/or one or more of the other resources 414. In some embodiments, the compute resources 410 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 410 can be or can include one or more hardware components architected in accordance with an advanced reduced instruction set computing ("RISC") machine ("ARM") architecture, available for license from ARM HOLDINGS. Alternatively, the compute resources 410 can be or can include one or more hardware components architected in accordance with an x86 architecture, such an architecture available from INTEL CORPORATION of Mountain View, California, and others. Those skilled in the art will appreciate the implementation of the compute resources 410 can utilize various computation architectures, and as such, the compute resources 410 should not be construed as being limited to any particular computation architecture or combination of computation architectures, including those explicitly disclosed herein.

The memory resource(s) 412 can include one or more hardware components that perform storage operations, including temporary or permanent storage operations. In some embodiments, the memory resource(s) 412 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 410.

The other resource(s) 414 can include any other hardware resources that can be utilized by the compute resources(s) 410 and/or the memory resource(s) 412 to perform operations described herein. The other resource(s) 414 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 402 can be virtualized by one or more virtual machine monitors ("VMMs") 416A-416N (also known as "hypervisors"; hereinafter "VMMs 416") operating within the control layer 404 to manage one or more virtual resources that reside in the virtual resource layer 406. The VMMs 416 can be or can include software, firmware, and/or hardware that alone or in combination with other software, firmware, and/or hardware, manages one or more virtual resources operating within the virtual resource layer 406.

The virtual resources operating within the virtual resource layer 406 can include abstractions of at least a portion of the compute resources 410, the memory resources 412, the other resources 414, or any combination thereof. These abstractions are referred to herein as virtual machines ("VMs"). In the illustrated embodiment, the virtual resource layer 406 includes VMs 418A-418N (hereinafter "VMs 418"). Each of the VMs 418 can execute one or more applications 420A-420N in the application layer 408. In some embodiments, the VMs 418 can be used to execute the quantum connection microservice 118, the intelligent routing microservice 120, and/or the SKR microservice 122.

Figure 5:
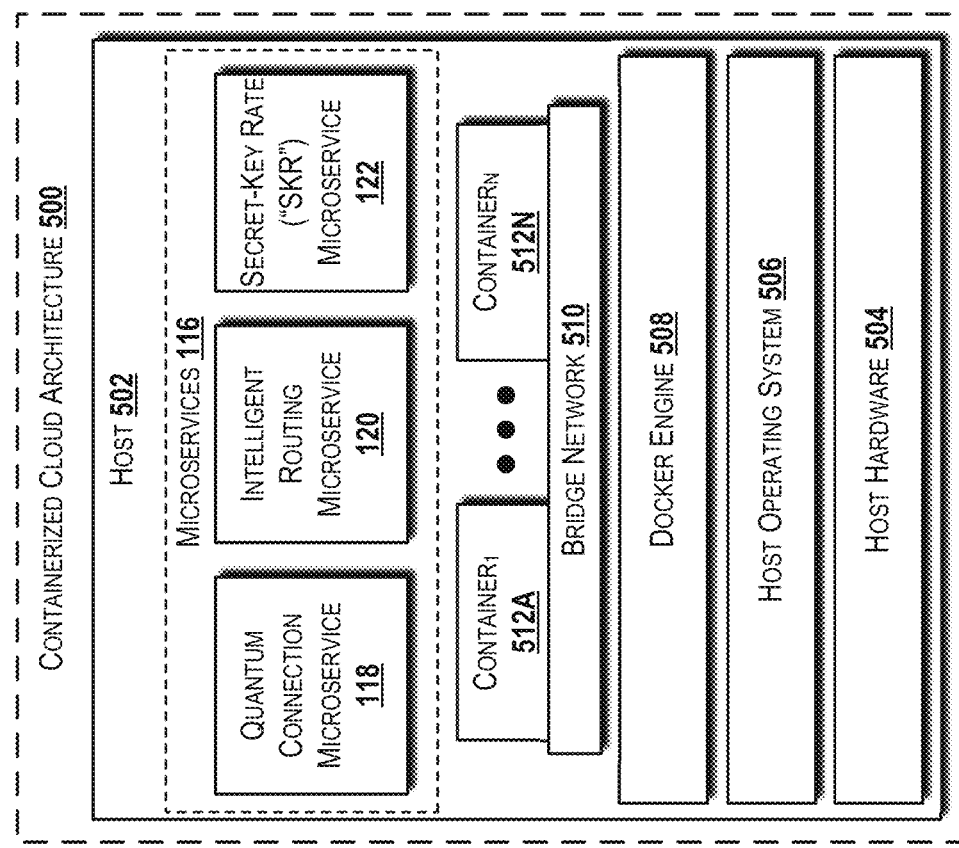
FIG. 5 is a block diagram illustrating an example containerized cloud architecture and components thereof capable of implementing, at least in part, aspects of the concepts and technologies disclosed herein, according to an illustrative embodiment.

Turning now to FIG. 5, a block diagram illustrating an exemplary containerized cloud architecture 500 capable of implementing, at least in part, aspects of the concepts and technologies disclosed herein will be described, according to an illustrative embodiment. The illustrated containerized cloud architecture 500 includes a host 502. Although one host 502 is shown, the containerized cloud architecture 500 can support any number of hosts 502, which may be in communication via an overlay network (not shown). The illustrated host 502 includes a host hardware 504, a host operating system 506, a DOCKER engine 508, a bridge network 510, a plurality of containers 512A-512N, the quantum connection microservice 118, the intelligent routing microservice 120, and/or the SKR microservice 122. The containerized cloud architecture 500 can be utilized by the cloud network 112 shown in FIG. 1.

The host hardware 504 can be implemented as bare metal hardware such as one or more physical servers. The host hardware 504 alternatively can be implemented using hardware virtualization. In some embodiments, the host hardware 504 can include compute resources, memory resources, and other hardware resources. These resources can be virtualized according to known virtualization techniques. A virtualized cloud architecture 400 is described herein with reference to FIG. 4. Although the containerized cloud architecture 500 and the virtualized cloud architecture 400 are described separately, these architectures can be combined to provide a hybrid containerized/virtualized cloud architecture. Those skilled in the art will appreciate that the disclosed cloud architectures are simplified for ease of explanation and can be altered as needed for any given implementation without departing from the scope of the concepts and technologies disclosed herein. As such, the containerized cloud architecture 500 and the virtualized cloud architecture 400 should not be construed as being limiting in any way.

Compute resources can include one or more hardware components that perform computations to process data and/or to execute computer-executable instructions. For example, the compute resources can execute instructions of the host operating system 506, the plurality of containers 512A-512N, the quantum connection microservice 118, the intelligent routing microservice 120, and/or the SKR microservice 122.

The compute resources of the host hardware 504 can include one or more central processing units ("CPUs") configured with one or more processing cores. The compute resources can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources can include one or more discrete GPUs. In some other embodiments, the compute resources can include CPU and GPU components that are configured in accordance with a co-processing CPU/GPU computing model, wherein the sequential part of an application executes on the CPU and the computationally-intensive part is accelerated by the GPU. The compute resources can include one or more system-on-chip ("SoC") components along with one or more other components, including, for example, one or more memory resources, and/or one or more other resources. In some embodiments, the compute resources can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources can be or can include one or more hardware components architected in accordance with an advanced reduced instruction set computing ("RISC") ("ARM") architecture, available for license from ARM HOLDINGS. Alternatively, the compute resources can be or can include one or more hardware components architected in accordance with an x86 architecture, such an architecture available from INTEL CORPORATION, and others. Those skilled in the art will appreciate the implementation of the compute resources can utilize various computation architectures, and as such, the compute resources should not be construed as being limited to any particular computation architecture or combination of computation architectures, including those explicitly disclosed herein.

The memory resources of the host hardware 504 can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources.

The other resource(s) of the host hardware 504 can include any other hardware resources that can be utilized by the compute resources(s) and/or the memory resource(s) to perform operations described herein. The other resource(s) can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The host operating system 506 can be proprietary, open source, or closed source. In some embodiments, the host operating system 506 can be or can include one or more container operating systems designed specifically to host containers such as the plurality of containers 512A-512N. For example, the host operating system 506 can be or can include FEDORA COREOS (available from RED HAT, INC), RANCHEROS (available from RANCHER), and/or BOTTLEROCKET (available from Amazon Web Services). In some embodiments, the host operating system 506 can be or can include one or more members of the WINDOWS family of operating systems from MICROSOFT CORPORATION (e.g., WINDOWS SERVER), the LINUX family of operating systems (e.g., CENTOS, DEBIAN, FEDORA, ORACLE LINUX, RHEL, SUSE, and UBUNTU), the SOLARIS family of operating systems from ORACLE CORPORATION, other operating systems, and the like.

The containerized cloud architecture 500 can be implemented utilizing any containerization technologies. Presently, open-source container technologies, such as those available from DOCKER, INC., are the most widely used, and it appears will continue to be for the foreseeable future. For this reason, the containerized cloud architecture 500 is described herein using DOCKER container technologies available from DOCKER, INC., such as the DOCKER engine 508. Those skilled in the art will appreciate that other container technologies may also be applicable to implementing the concepts and technologies disclosed herein, and as such, the containerized cloud architecture 500 is not limited to DOCKER container technologies. Moreover, although open-source container technologies are most widely used, the concepts and technologies disclosed here may be implemented using proprietary technologies or closed source technologies.

The DOCKER engine 508 can be based on open source containerization technologies available from DOCKER, INC. The DOCKER engine 508 enable users (not shown) to build and containerize applications. The full breadth of functionality provided by the DOCKER engine 508 and associated components in the DOCKER architecture are beyond the scope of the present disclosure. As such, the primary functions of the DOCKER engine 508 will be described herein in brief, but this description should not be construed as limiting the functionality of the DOCKER engines 508 or any part of the associated DOCKER architecture. Instead, those skilled in the art will understand the implementation of the DOCKER engines 508 and other components of the DOCKER architecture to facilitate building and containerizing applications within the containerized cloud architecture 500.

The DOCKER engine 508 functions as a client-server application executed by the host operating system 506. The DOCKER engine 508 provides a server with a daemon process along with APIs that specify interfaces that applications can use to communicate with and instruct the daemon to perform operations. The DOCKER engine 508 also provides a command line interface ("CLI") that uses the APIs to control and interact with the daemon through scripting and/or CLI commands. The daemon can create and manage objects such as images, containers, networks, and volumes. Although a single DOCKER engine 508 is illustrated in the host 502, multiple DOCKER engines 508 are contemplated. The DOCKER engines 508 can be run in swarm mode.

The bridge network 510 enables the plurality of containers 512A-512N connected to the same bridge network to communicate. In this manner, the bridge network 510 can isolate at least a portion of the plurality of containers 512 to prevent direct communication. In some embodiments, the bridge network 510 is a software network bridge implemented via the DOCKER bridge driver. The DOCKER bridge driver enables default and user-defined network bridges.

The plurality of containers 512A-512N can be runtime instances of images. The plurality of containers 512A-512N are described herein specifically as DOCKER containers, although other containerization technologies are contemplated as noted above. Each of the plurality of containers 512A-512N can include an image, an execution environment, and a standard set of instructions.

Microservices, such as the microservices 116, and more particularly the quantum connection microservice 118, the intelligent routing microservice 120, and the SKR microservice 122 are applications that provide a focused piece of functionality and are often smaller and more lightweight than traditional services. In some embodiments, each of the microservices 116 is provided by one of the plurality of containers 512A-512N, although each of the plurality of containers 512A-512N may contain multiple microservices 516. For example, the microservices 116 can include, but are not limited, to server, database, and other executable applications to be run in an execution environment provided by a container 512. The microservices 116 can provide any type of functionality, and therefore all the possible functions cannot be listed herein.

Figure 6:
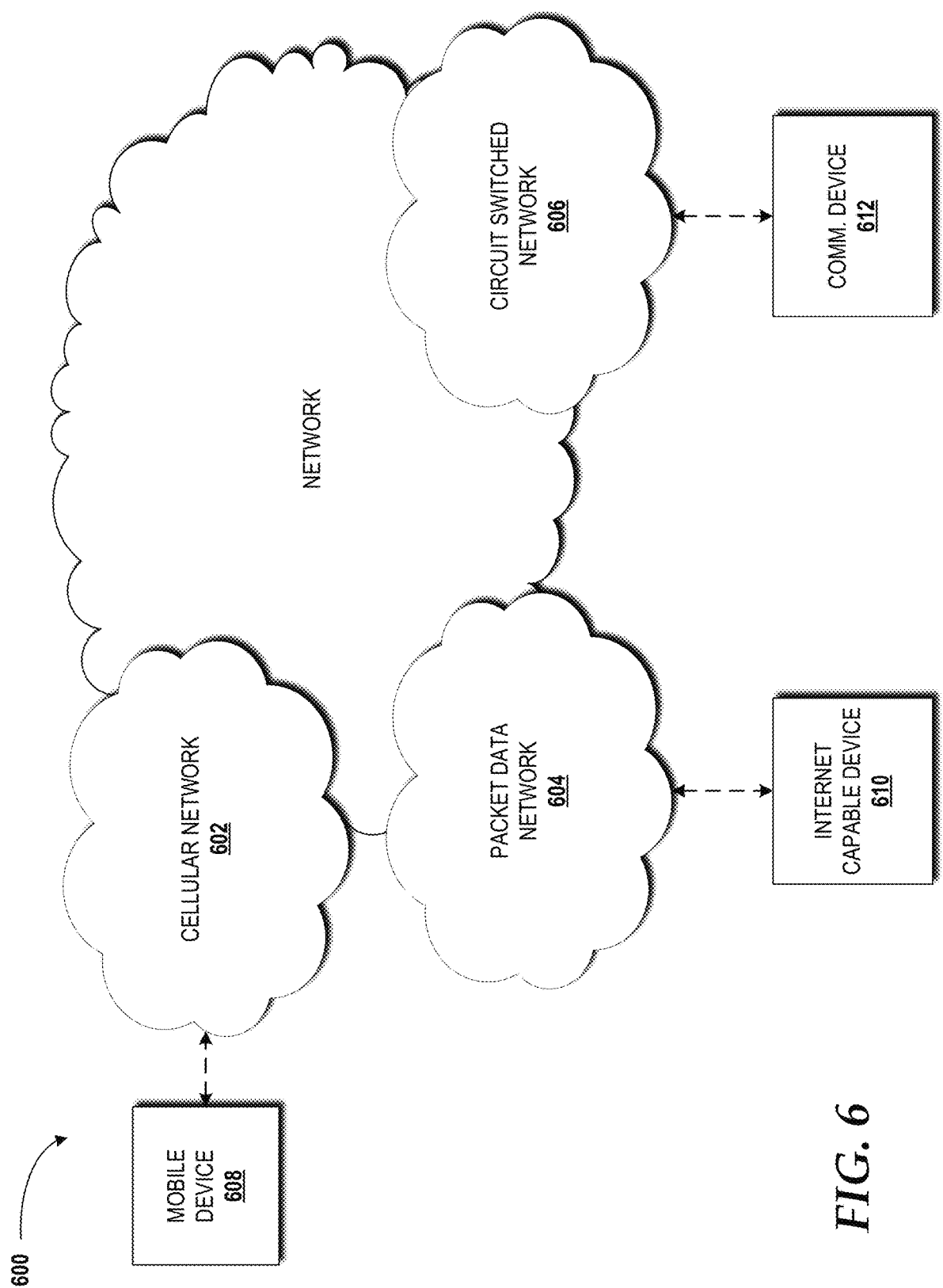
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, and a circuit switched network 606, for example, a PSTN. It is contemplated that the QKD networks 108A-108N illustrated and described above with reference to FIG. 1 can function as a backbone for the network 600 or any portion thereof.

The cellular network 602 includes various components such as, but not limited to, base transceiver stations ("BTSs"), Node-Bs, eNodeBs, gNodeBs, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, general packet radio service ("GPRS") core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 4G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved mobile standards such as 5G and future iterations thereof.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a POTS. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Figure 7:
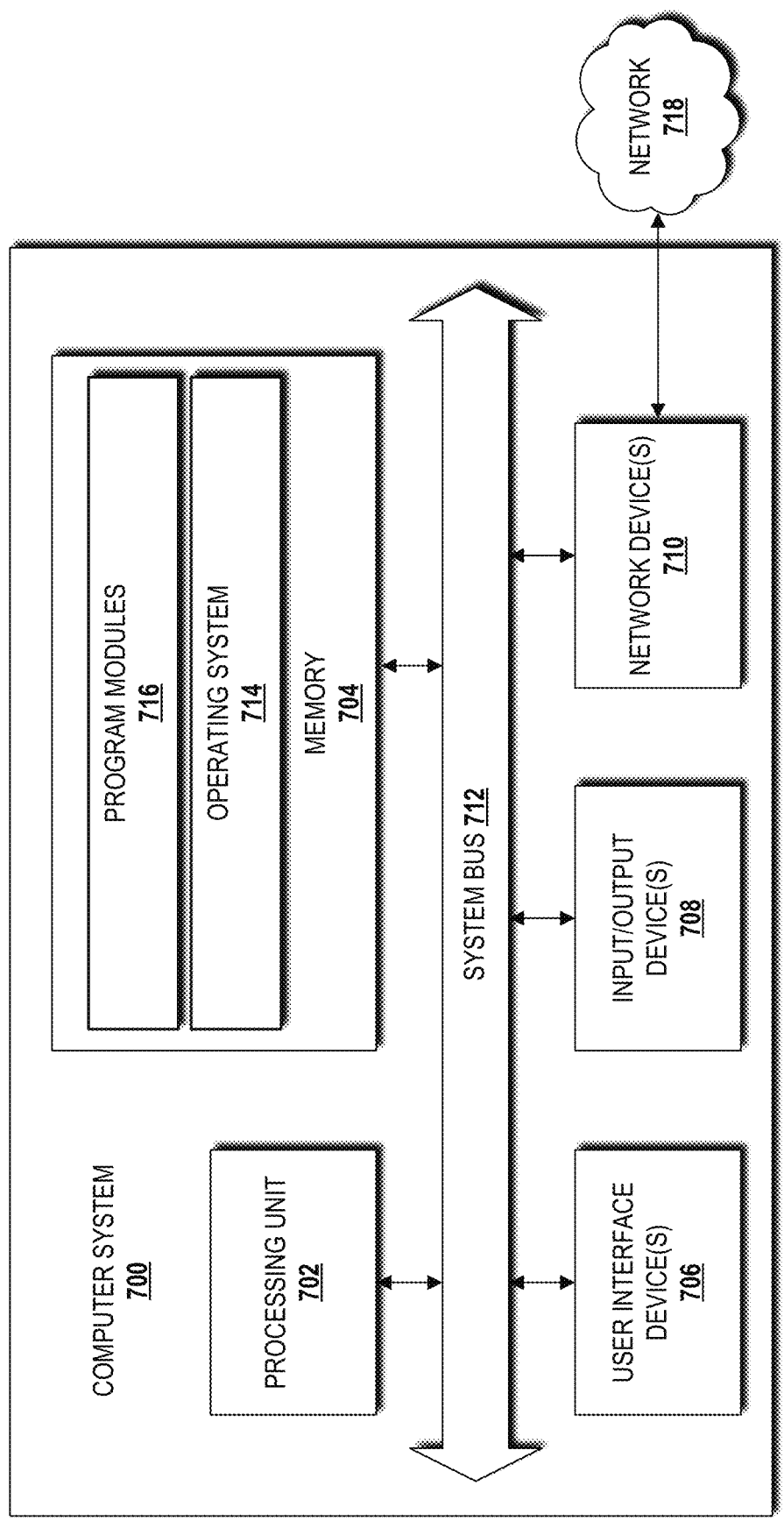
FIG. 7 is a block diagram illustrating an example computer system capable of implementing aspects of the embodiments presented herein.

FIG. 7 is a block diagram illustrating a computer system 700 configured to provide the functionality in accordance with various embodiments of the concepts and technologies disclosed herein. It should be understood, however, that modification to the architecture may be made to facilitate certain interactions among elements described herein. In some embodiments, the user computer systems 112A, 112B, the microservices controller 114, and/or other systems/devices/elements disclosed herein can utilize an architecture the same as or similar to the architecture of the computer system 700.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium," "computer-readable storage medium," and variations thereof does not include waves or signals per se and/or communication media, and therefore should be construed as being directed to "non-transitory" media only.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network 718. The network 718 can be configured similar to or the same as the network 600 illustrated and described herein with reference to FIG. 6. The network 718 can be or can include the QKD network 108. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be a wired network such as, but not limited to, a Wide Area Network ("WAN"), a wired Personal Area Network ("PAN"), or a wired Metropolitan Area Network ("MAN"). The network 718 may be any other network described herein.

Figure 8:
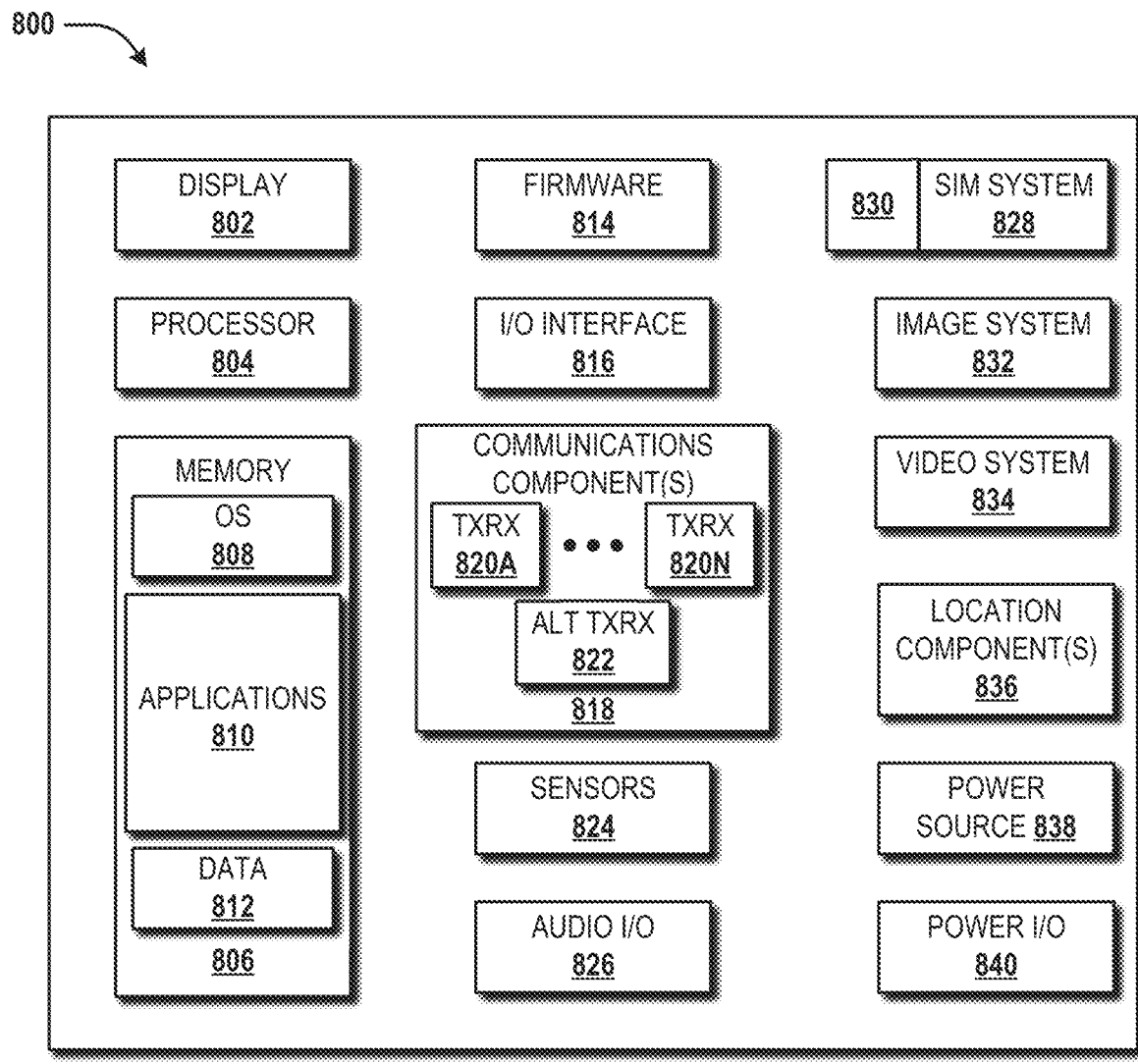
FIG. 8 is a block diagram illustrating an example mobile device capable of implementing aspects of the embodiments disclosed herein.

Turning now to FIG. 8, an illustrative mobile device 800 and components thereof will be described. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way. In some embodiments, the mobile communications device 608 shown in FIG. 6 is configured the same as or similar to the mobile device 800. In some embodiments, the user computer systems 112A, 112B can be configured the same as or similar to the mobile device 800.

As illustrated in FIG. 8, the mobile device 800 can include a display 802 for displaying data. According to various embodiments, the display 802 can be configured to display various GUI elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in a memory 806, or the like. In some embodiments, the applications 810 also can include a user interface ("UP") application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in dialing telephone numbers, entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. According to various embodiments, the data 812 can include, for example, telephone dialer applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMA ONE, CDMA2000, LTE, and various other 2G, 2.5G, 4G, 4G, 5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from GPS devices, assisted GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that concepts and technologies directed to QKD networking as a service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    establishing, by a microservices controller, a plurality of quantum connections with a plurality of virtual quantum connection managers deployed in association with a set of quantum user nodes in a quantum key distribution network;
    receiving, by the microservices controller, a request to initialize the quantum key distribution network, wherein the request to initialize the quantum key distribution network comprises an indication of a desired network topology for the quantum key distribution network;

coordinating, by the microservices controller, with the plurality of virtual quantum connection managers to initialize the quantum key distribution network, wherein initializing the quantum key distribution network comprises configuring, by the microservices controller, a plurality of quantum links between the set of quantum user nodes based on the desired network topology for the quantum key distribution network;

receiving, by the microservices controller, a quantum key distribution service request from a quantum key distribution network operator, wherein the quantum key distribution service request identifies a secret-key rate requirement;

obtaining, by the microservices controller, a plurality of secret-key rates, wherein each of the plurality of secret-key rates corresponds to an associated secret-key rate for a respective quantum link of the plurality of quantum links; and invoking, by the microservices controller, a quantum connection microservice to configure a source quantum user node and a destination quantum user node along a least cost quantum key distribution path to provide a quantum key distribution service requested by the quantum key distribution service request, wherein the least cost quantum key distribution path is identified based on the plurality of secret-key rates and the secret-key rate requirement.

2. The method of claim 1, wherein the microservices controller establishes the plurality of quantum connections with the plurality of virtual quantum connection managers via invoking the quantum connection microservice.

3. The method of claim 1, wherein the microservices controller establishes the plurality of quantum connections with the plurality of virtual quantum connection managers via invoking a plurality of microservices, and wherein each of the plurality of quantum connections is associated with one virtual quantum connection manager of the plurality of virtual quantum connection managers.

4. The method of claim 1, wherein each of the plurality of quantum connections is associated with one virtual quantum connection manager of the plurality of virtual quantum connection managers, and wherein the one virtual quantum connection manager comprises a weblet that is executed by the source quantum user node or the destination quantum user node.

5. The method of claim 1, wherein each of the plurality of quantum links provides a quantum communication channel between two quantum user nodes of the set of quantum user nodes.

6. The method of claim 1, wherein each of the plurality of quantum links provides a quantum communication channel between one transfer repeater node and one quantum user node of the set of quantum user nodes.

7. The method of claim 1, wherein the desired network topology is based on a default setting.

8. The method of claim 1, wherein the microservices controller invokes a plurality of microservices to handle the quantum key distribution service request.

9. The method of claim 1, wherein each of the plurality of secret-key rates comprises a real-time value based on a condition of an associated quantum link.

10. The method of claim 1, further comprising notifying, by the microservices controller, the quantum key distribution network operator that the quantum key distribution service request was successful.

11. A system comprising:
a microservices controller; and
a plurality of microservices controlled by the microservices controller, wherein the plurality of microservices are executed by a cloud network, and wherein the microservices controller invokes the plurality of microservices to perform operations comprising
establishing a plurality of quantum connections with a plurality of virtual quantum connection managers deployed in association with a set of quantum user nodes in a quantum key distribution network,
receiving a request to initialize the quantum key distribution network, wherein the request to initialize the quantum key distribution network comprises an indication of a desired network topology for the quantum key distribution network,
coordinating with the plurality of virtual quantum connection managers to initialize the quantum key distribution network, wherein initializing the quantum key distribution network comprises configuring, by the microservices controller, a plurality of quantum links between the set of quantum user nodes based on the desired network topology for the quantum key distribution network,
receiving a quantum key distribution service request from a quantum key distribution network operator, wherein the quantum key distribution service request identifies a secret-key rate requirement,
obtaining a plurality of secret-key rates, wherein each of the plurality of secret-key rates corresponds to an associated secret-key rate for a respective quantum link of the plurality of quantum links, and
invoking a quantum connection microservice to configure a source quantum user node and a destination quantum user node along a least cost quantum key distribution path to provide a quantum key distribution service requested by the quantum key distribution service request, wherein the least cost quantum key distribution path is identified based on the plurality of secret-key rates and the secret-key rate requirement.

12. The system of claim 11, wherein each of the plurality of quantum links provides a quantum communication channel between one transfer repeater node and one quantum user node of the set of quantum user nodes.

13. The system of claim 12, wherein the desired network topology is based on a default setting.

14. The system of claim 11, wherein each of the plurality of quantum connections is associated with one virtual quantum connection manager of the plurality of virtual quantum connection managers, and wherein the one virtual quantum connection manager comprises a weblet that is executed by the source quantum user node or the destination quantum user node.

15. The system of claim 11, wherein each of the plurality of secret-key rates comprises a real-time value based on a condition of an associated quantum link.

16. A computer-readable storage medium comprising computer-executable instructions that, when executed by a processor of a microservices controller, causes the processor to invoke a plurality of microservices to perform operations comprising:
establishing a plurality of quantum connections with a plurality of virtual quantum connection managers deployed in association with a set of quantum user nodes in a quantum key distribution network;

receiving a request to initialize the quantum key distribution network, wherein the request to initialize the quantum key distribution network comprises an indication of a desired network topology for the quantum key distribution network;

coordinating with the plurality of virtual quantum connection managers to initialize the quantum key distribution network, wherein initializing the quantum key distribution network comprises configuring, by the microservices controller, a plurality of quantum links between the set of quantum user nodes based on the desired network topology for the quantum key distribution network;

receiving a quantum key distribution service request from a quantum key distribution network operator, wherein the quantum key distribution service request identifies a secret-key rate requirement;

obtaining a plurality of secret-key rates, wherein each of the plurality of secret-key rates corresponds to an associated secret-key rate for a respective quantum link of the plurality of quantum links; and invoking a quantum connection microservice to configure a source quantum user node and a destination quantum user node along a least cost quantum key distribution path to provide a quantum key distribution service requested by the quantum key distribution service request, wherein the least cost quantum key distribution path is identified based on the plurality of secret-key rates and the secret-key rate requirement.

17. The computer-readable storage medium of claim 16, wherein each of the plurality of quantum connections is associated with one virtual quantum connection manager of the plurality of virtual quantum connection managers, and wherein the one virtual quantum connection manager comprises a weblet that is executed by the source quantum user node or the destination quantum user node.

18. The computer-readable storage medium of claim 16, wherein each of the plurality of quantum links provides a quantum communication channel between one transfer repeater node and one quantum user node of the set of quantum user nodes.

19. The computer-readable storage medium of claim 16, wherein each of the plurality of quantum links provides a quantum communication channel between two quantum user nodes of the set of quantum user nodes.

20. The computer-readable storage medium of claim 19, wherein each of the plurality of secret-key rates comprises a real-time value based on a condition of an associated quantum link.

* * * * *